United States Patent [19]

Sundstrom

[11] Patent Number: 5,205,688
[45] Date of Patent: Apr. 27, 1993

[54] DEFORMABLE PLUG OF A WALL FASTENER

[75] Inventor: Inge Sundstrom, Nyköping, Sweden

[73] Assignee: Thorsman & Co Aktiebolag, Nykoping, Sweden

[21] Appl. No.: 721,455

[22] PCT Filed: Jan. 4, 1990

[86] PCT No.: PCT/SE90/00009
§ 371 Date: Jul. 3, 1991
§ 102(e) Date: Jul. 3, 1991

[87] PCT Pub. No.: WO90/08265
PCT Pub. Date: Jul. 26, 1990

[30] Foreign Application Priority Data
Jan. 11, 1989 [SE] Sweden .................... 8900069

[51] Int. Cl.5 ............... F16B 13/04; F16B 13/06
[52] U.S. Cl. ........................ 411/38; 411/34; 411/59; 411/908
[58] Field of Search ............... 411/34–38, 411/55, 59, 508–510, 908

[56] References Cited

U.S. PATENT DOCUMENTS

| | | | |
|---|---|---|---|
| 2,018,251 | 10/1935 | Croessant | 411/37 |
| 3,888,156 | 6/1975 | Fima | 411/38 |
| 3,937,122 | 2/1976 | Riedel | 411/34 |
| 4,642,009 | 2/1987 | Fischer | 411/38 |
| 4,789,285 | 12/1988 | Fischer | 411/34 |

FOREIGN PATENT DOCUMENTS

| | | | |
|---|---|---|---|
| 212600 | 7/1956 | Australia | 411/38 |
| 0092833 | 11/1983 | European Pat. Off. | |
| 0169335 | 1/1986 | European Pat. Off. | |
| 2328385 | 12/1973 | Fed. Rep. of Germany | |
| 2732393 | 2/1979 | Fed. Rep. of Germany | 411/38 |
| 415055 | 9/1980 | Sweden | |
| 1505595 | 3/1978 | United Kingdom | 411/38 |

Primary Examiner—Neill R. Wilson
Attorney, Agent, or Firm—Ladas & Parry

[57] ABSTRACT

A fastening device in the form of a plug and a screw is adapted for installation in a blind bore of a thick wall or in a through hole in a thin wall. The plug is formed as an elongated body having a central longitudinal hole. The body has inner and outer end portions and two parallel slots extending longitudinally between the end portions to define four legs arranged circumferentially around the body. The legs diverge from the end portions to form an increasing diameter for the body which reaches a maximum at the center of the body. When the plug is inserted into a blind bore the legs are displaced inwardly to reduce the size of the central longitudinal hole so that when the screw is inserted into the plug, the screw will exert force on the legs to press the legs against the wall with strong radial forces. When the plug is inserted in a thin wall, threaded engagement between the screw and the inner end portion of the plug produces longitudinal displacement of the inner end portion and radial deformation of the legs to provide clamping pressure at the back of the wall at four distant locations.

12 Claims, 2 Drawing Sheets

DEFORMABLE PLUG OF A WALL FASTENER

FIELD OF THE INVENTION

The present invention relates to a fastening device in the form of a plug, preferably made of plastic material, having a central, longitudinal hole for cooperation with a fastening element in the form of a screw or equivalent and intended to be arranged in a pre-drilled hole in building components of practically all types including wall boards on studs, light concrete walls, hollow brick walls, solid brick walls, and cast concrete. The plug comprises, in its fixed condition, an inner end portion in the penetrating hole of which a thread is arranged or means are provided to facilitate thread cutting, four legs extending from the inner end portion and an outer end portion in which the legs join and which comprises a stop flange or equivalent for bearing on the edge of the hole.

BACKGROUND

Several different embodiments of such universal plugs for use in hollow walls as well as in walls of solid material are known. In the first mentioned case the plug is put in a through hole in the support and in the latter case in a dead end hole. When the known plugs are arranged in a through hole in a board it is intended that, at the introduction of the cooperating screw in the inner end portion, the plug should be contracted axially and the legs should be bent or broken preferably radially outwards creating a support at the back side of the board. In order to facilitate the bending of the legs the known plugs are as a rule made from a relatively soft plastic material. This means that the part of the plug on the back side of the board will rotate more or less during the introduction of the screw depending on the design of the plug and the material of the same and the legs will position themselves over each other. Such plugs of soft material mounted in wall boards of plaster have, however, shown to give less withdrawal resistance than plugs made from hard plastic material which plugs do not tend to rotate as much and bear better on the hole edge. Plugs of a harder material also show a considerable increase of moment indicating when the screw is sufficiently tightened which eliminates the risk of damaging the plug or the edge of the hole.

On plugs of hard plastic material the legs will, however, not be easily bent or broken radially outwards. In order to facilitate the breaking outwards, the legs have been provided with bending notches in combination with a slight deviation of the legs. The deviation is achieved by means of the fact that the common sectional form of the legs, the number of which due to manufacturing reasons is limited to two, at the middle portion of the plug, forms an ellipse which in the direction of the end portions transforms into a circle. Such a plug comprising two legs with a middle portion having an elliptical section is known from the European Patent EP-A-0169335.

For use of universal plugs in dead end holes it has been advantageous to make the plug from a relatively hard material which does not have cold flow properties which would cause the plug to lose its grip in the wall as time goes on. The axial contraction of the universal plug in hard wall materials, is not sufficient to ensure the grip of the plugs in the wall. The enlarging of the middle portions of the legs in the plug in said European Patent gives an essential improvement of the expansion properties of such a plug. The expansion of the plug takes place, however, only in two opposite directions and the withdrawal resistance does not reach values corresponding to values for known expansion plugs designed for hard wall materials. These plugs are usually divided in four legs by means of radial slots.

SUMMARY OF THE INVENTION

The object of the present invention is to provide a universally usable fastening device in the form of a plug by means of which it is possible to achieve with all types of supports values for the withdrawal resistance corresponding to values attainable by means of fastening devices especially designed for each type of support. A further object is to provide a plug which by means of its design makes it possible to be produced by injection molding in an injection tool of the same relatively simple design, with regard to the number of moving parts, which plugs having only two legs allow.

BRIEF DESCRIPTION OF THE FIGURES OF THE DRAWING

An embodiment of the invention will be described in detail with reference to the accompanying drawing in which.

DETAILED DESCRIPTION OF A PREFERRED EMBODIMENT

Figure 1:
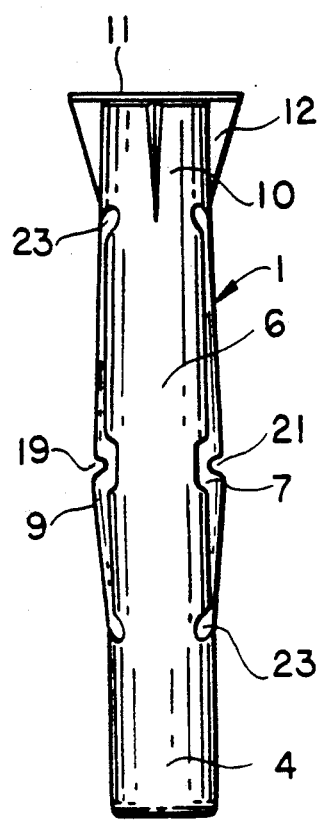
FIG. 1 shows a plug in a side view.
Figure 2:
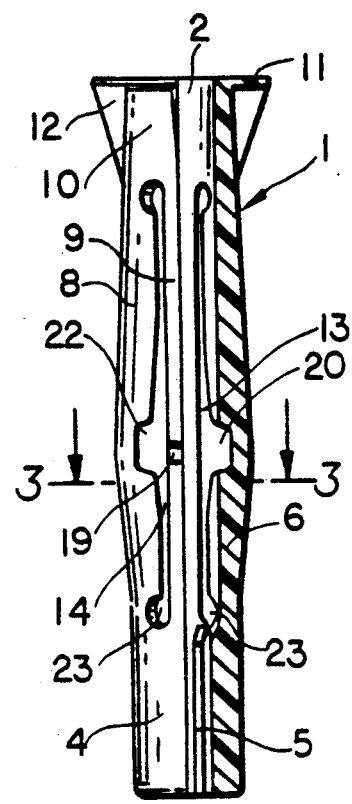
FIG. 2 shows the same plug rotated 90° around its longitudinal axis in a side view and partly sectioned.
Figure 3:
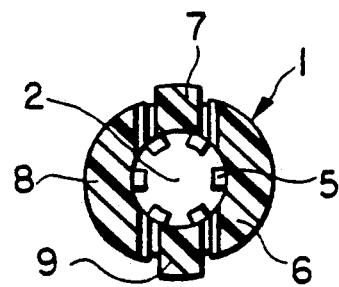
FIG. 3 is a section taken a long line A—A through the center portion of the plug.
Figure 6:
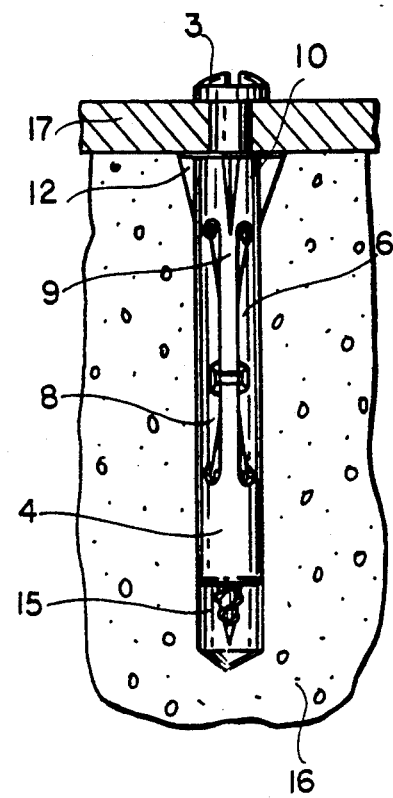
FIG. 5 shows the plug according to FIG. 4 seen from the back of the board and FIG. 6 shows a plug mounted in a solid building component.

The fastening device according to the invention comprises a plug 1 of preferably plastic material, which is provided with an axially arranged hole 2 adapted for cooperation with a screw 3. The plug 1 comprises, in its fixed condition, an inner end portion 4 in which the through hole 2 is provided with an inner thread or, as shown in FIGS. 2 and 3, internal ridges 5 in which the screw at the introduction in the plug cuts threads. From the inner end portion 4, four circumferentially spaced legs 6-9 extend which connect to an outer end portion 10 which is provided with a flange 11 and means 12 to stop rotation of the plug. The four legs are defined by two slots 13, 14 arranged in essentially parallel planes having an increasing width in the direction of the central part of the plug. The central portions of the legs 6-9 are somewhat divergent and the plug has its largest part in the transverse direction at this central extent. Due to the fact that the inner surfaces of the legs 6-9 are bounded by the circular hole 2 and thus are straight in the axial direction, the legs also have their greatest thickness at the center part. FIG. 3, shows that the design of the outer profile of the legs is such that if the legs are pressed to bear against each other for example, by the introduction of the plug in a blind bore or dead end hole 15, having nominal diameter, in a building component 16, as shown in FIG. 6, then the center part of the plug will have essentially the same diameter as the end portions. Hereby a contraction will be created in the center portion of the hole 2, through which the cooperating screw 3, during the fastening of an object 17, will be screwed creating a wedge effect and the plug will expand and be caused to bear on four sectors of the wall of the hole with considerable force.

Figure 4:
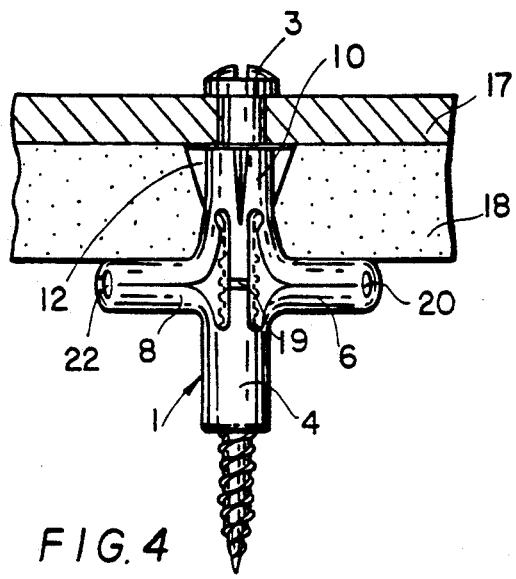
FIG. 4 shows a plug mounted in a thin board.
Figure 5:
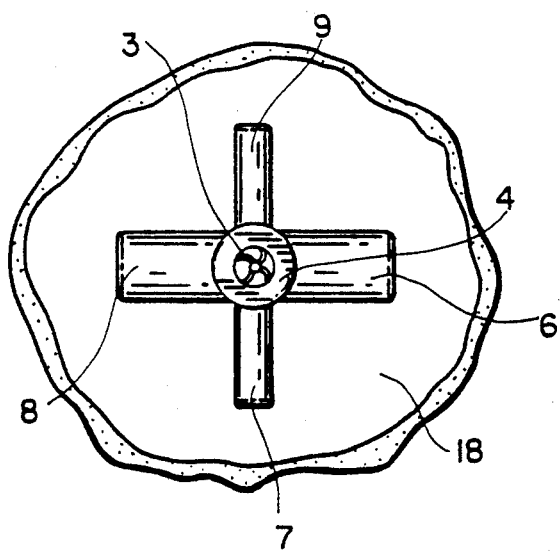

During the fastening of an object 17 on a wall board of a building component according to FIGS. 4 and 5 by means of introducing the cooperating screw 3 into the hole of the inner end portion provided with the ridges 5, said end portion is pulled in the direction of the back side of the board 18. Hereby the legs 6–9 are bent or broken radially outwards which is facilitated, on the one hand, by the fact that the legs are somewhat divergent and on the other hand by the fact that the legs are provided with sectional weakenings in the form of notches 19–22 arranged at the center parts of the legs. Of these notches, the notches 20, 22 on the legs 6, 8 outside the parallel planes of the slots, are formed in the inside surface of legs 6, 8 while the notches 19, 21 on the legs 7, 9 between the planes of the slots are formed in the outside surface of legs 7, 9. The bending of the legs 6, 8 is further facilitated by the arrangement of sectional weakenings 23 at the ends of the slots.

By means of the design of the plug with four legs upon installation in a board the legs will be deformed in four directions and more equal load around the hole will be achieved and, compared to known universal plugs, a larger capacity will be developed to resist withdrawal forces. Further the arrangement of the slots 13, 14 in two parallel planes and the outward sectional weakening 19 on the legs 7, 9 between the planes of the slots makes it possible to produce the plug by means of injection moulding in an injection tool having few parts moving in relation to each other.

What is claimed is:

1. A fastening device including a plug comprising an elongated body having a central, longitudinal hole for receiving a threaded fastener, said body having a tubular wall surrounding said longitudinal hole, said body having inner and outer end portions, said inner end portion including means for threadably engaging the threaded fastener such that upon turning said threaded fastener said inner end portion will be urged longitudinally towards said outer end portion, said elongated body being provided with two slots extending longitudinally, in parallel planes, between said end portions, each slot being offset from the center of said longitudinal hole to pass through the wall of said body twice in two aligned regions of the wall to define four legs arranged, in two pairs, circumferentially around said body, said four legs defining an increasing diameter of said body in the longitudinal direction from said end portions to a central portion of said body, each of said legs having a thickness which increases from said end portions towards said central portion, the arrangement of said legs being such that when the plug is inserted into a bore in a wall, the legs will be radially compressed at said central portion to reduce the size of said hole thereat, and radial force will be developed between the fastener and said plug to apply radial force to the wall by said legs at four circumferential locations.

2. A fastening device as claimed in claim 1 comprising a flange on said outer end portion to limit insertion of the plug into the bore in the wall.

3. A fastening device as claimed in claim 1 wherein said legs of both of said pairs have notches therein at said central portion to facilitate deformation of said legs.

4. A fastening device as claimed in claim 3 wherein the notches in the legs of one of said pairs is formed in the inside of the legs whereas the notches in the legs of the other of the pairs is formed in the outside of the legs.

5. A fastening device as claimed in claim 4 wherein said legs in the other of said pairs extend radially outwards of the legs in said one pair prior to insertion of said plug into said bore.

6. A fastening device as claimed in claim 3 wherein said body has further notches at said end portions to enlarge the size of the slot thereat.

7. A fastening device as claimed in claim 3 wherein the notches in the legs of each said pair are diametrically opposed at said central portion.

8. A fastening device as claimed in claim 1 wherein the diameter of said body increases uniformly from said end portions to said central portion.

9. A fastening device as claimed in claim 1 wherein said slots increase in width from said end portions to said central portion.

10. A fastening device as claimed in claim 1, wherein the legs in one of said pairs are of smaller circumferential extent than the legs in the other of said pairs.

11. A fastening device as claimed in claim 1, wherein said body comprises injection molded plastic material.

12. A method of producing a plug of a fastening device adapted for mounting in a bore in a wall, said method comprising forming the plug as an elongated body with a central hole and inner and outer end portions, forming two longitudinal slots in said body extending in parallel planes offset from the center of the hole so that each slot passes through the wall of the body twice in two aligned regions and the slots define four legs arranged, in two pairs, circumferentially around the body, forming the legs so that they diverge from said end portions to a center portion of the body whereat the diverging legs provide an increased diameter for said plug while the central hole extends uniformly through the body, and forming notches in the outer surface of one pair of legs and notches in the inner surface of the other pair of legs whereby upon inserting the plug into a bore in a wall the legs undergo inward displacement at said center portion to reduce the size of said central hole thereat, so that upon inserting a threaded fastener into the reduced hole at said center portion radical force is exerted on said legs to press the four legs outwardly in the bore against the wall, and threaded engagement with said inner end portion urges said inner end portion longitudinally towards said outer end portion.

* * * * *